(12) United States Patent
Burks et al.

(10) Patent No.: US 6,682,123 B2
(45) Date of Patent: Jan. 27, 2004

(54) RETRACTABLE COVER FOR SMALL VEHICLES

(75) Inventors: Jay Burks, Blairsville, GA (US); Kayce Burks, Blairsville, GA (US)

(73) Assignee: Jay and Kayce Burks, Blairsville, GA (US)

(*) Notice: Subject to any disclaimer, the term of this patent is extended or adjusted under 35 U.S.C. 154(b) by 0 days.

(21) Appl. No.: 10/147,755

(22) Filed: May 16, 2002

(65) Prior Publication Data

US 2002/0125730 A1 Sep. 12, 2002

Related U.S. Application Data

(62) Division of application No. 09/650,216, filed on Aug. 29, 2000, now Pat. No. 6,412,851.

(51) Int. Cl.[7] .................................................. B60J 11/00
(52) U.S. Cl. ..................... 296/98; 296/136; 160/370.22
(58) Field of Search ......................... 296/98, 136, 95.1; 160/370.22

(56) References Cited

U.S. PATENT DOCUMENTS

| | | | | |
|---|---|---|---|---|
| 1,748,031 A | * | 2/1930 | Wiener et al. | |
| 1,918,423 A | * | 7/1933 | Persinger | |
| 2,688,513 A | * | 9/1954 | Poirier | |
| 3,050,075 A | * | 8/1962 | Kaplan et al. | |
| 4,834,446 A | * | 5/1989 | Tung-Chow | |
| 4,901,895 A | * | 2/1990 | Gancarz | |
| 4,929,016 A | * | 5/1990 | Kastanis | |
| 5,029,933 A | * | 7/1991 | Gillem | |
| 5,161,849 A | * | 11/1992 | Holland, Jr. | |
| 5,240,305 A | * | 8/1993 | Trethewey | |
| 5,364,155 A | * | 11/1994 | Kuwahara et al. | |
| 5,364,156 A | * | 11/1994 | Zerow | |
| 5,388,883 A | * | 2/1995 | Yang | |
| 5,401,074 A | * | 3/1995 | Timerman | |
| 5,409,286 A | * | 4/1995 | Huang | |
| 5,456,515 A | * | 10/1995 | Dang | |
| 5,488,981 A | * | 2/1996 | Burkhart | |
| 5,490,707 A | * | 2/1996 | De La Cruz | |
| 5,497,819 A | * | 3/1996 | Chiang | |
| 5,564,770 A | * | 10/1996 | Smith et al. | |
| 5,615,924 A | * | 4/1997 | Owen | |
| 5,816,641 A | * | 10/1998 | Chen | |
| 5,820,200 A | * | 10/1998 | Zubillaga et al. | |
| 5,897,156 A | * | 4/1999 | Hayard et al. | |
| 5,927,793 A | * | 7/1999 | McGrath, Jr. | |
| 5,941,593 A | * | 8/1999 | McCann | |
| 5,954,388 A | * | 9/1999 | Liggett | |
| 5,997,071 A | * | 12/1999 | Mazzarelli | |
| 6,012,759 A | * | 1/2000 | Adamek | |
| 6,070,629 A | * | 6/2000 | Whiteside | |
| 6,412,851 B1 | * | 7/2002 | Burks et al. | 296/98 |

* cited by examiner

Primary Examiner—D. Glenn Dayoan
Assistant Examiner—Paul Chenevert
(74) Attorney, Agent, or Firm—Thomas, Kayden, Horstemeyer & Risley, LLP

(57) ABSTRACT

A retractable cover for protecting small vehicles from the weather elements which substantially covers the top and side surfaces of the vehicle. The cover is affixed to a winding mechanism and is encased in a housing when in a fully retracted position. The housing is attached to the exterior of the vehicle with brackets. In the extended position, the cover overlays the top and sides of the vehicle and is secured in place with retention members to the exterior of the vehicle.

6 Claims, 4 Drawing Sheets

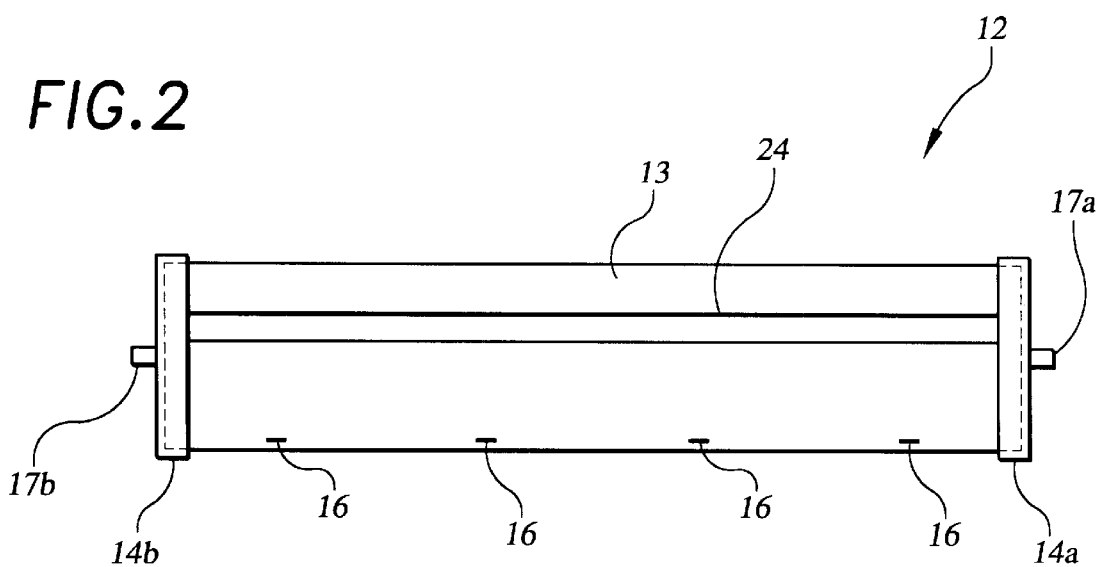
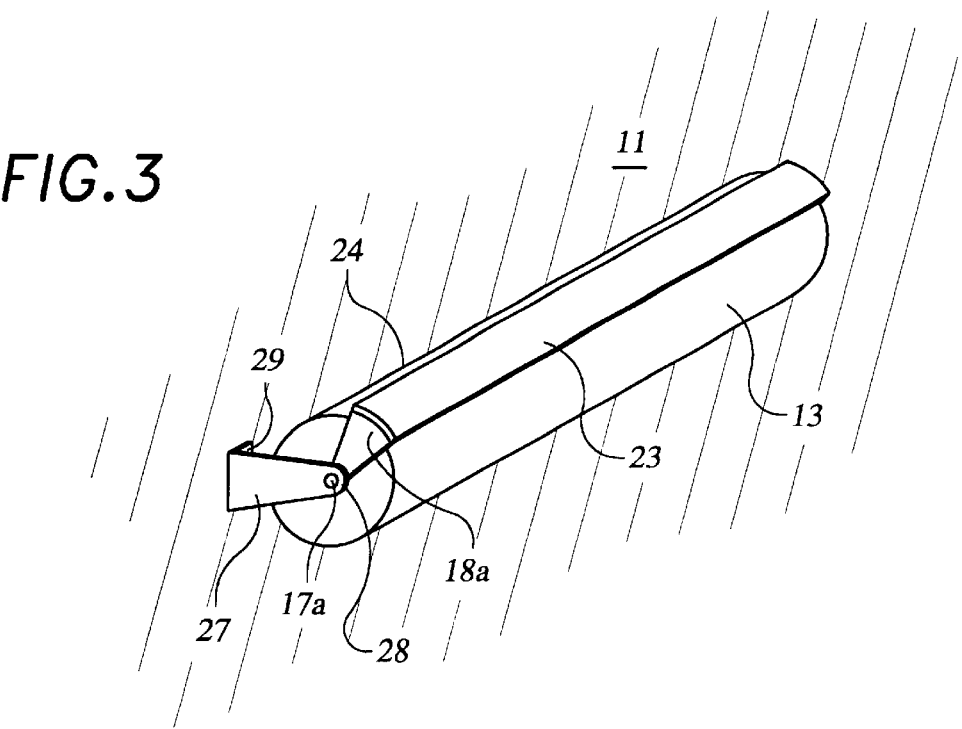

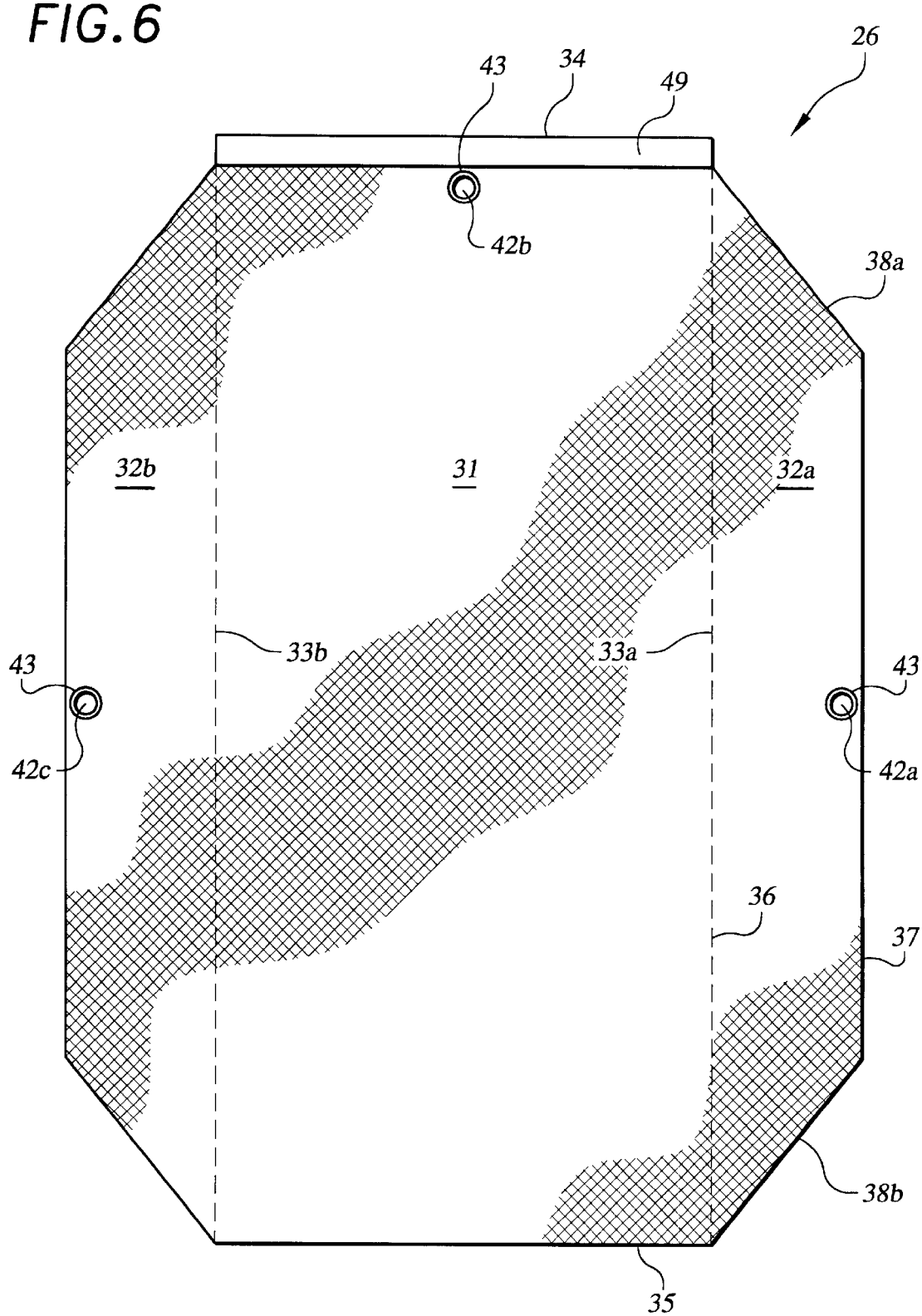

RETRACTABLE COVER FOR SMALL VEHICLES

CROSS-REFERENCE TO RELATED APPLICATION

This application is a divisional of copending U.S. utility application entitled, "Retractable Cover for Small Vehicles" having Ser. No. 09/650,216, filed Aug. 29, 2000 now U.S. Pat. No. 6,412,851 BI patented Jul. 2, 2002, which is entirely incorporated herein by reference.

TECHNICAL FIELD

The present invention is generally related to a cover for protecting ride-on lawn mowers, all-terrain vehicles (ATVs), and other small vehicles from the weather and, more particularly, is related to a system and method for a cover assembly which is encased in a housing and self-retracts using a winding mechanism in the housing and which is so dimensioned that it substantially covers the top and side surfaces of the small vehicle and which is secured, in an extended position, with retention members.

BACKGROUND OF THE INVENTION

Protective covers for automobiles or the like have been proposed in various forms, including retractable, weather-proof covers. These existing vehicle cover designs have inherent problems, such as bulk resulting from large amounts of coverage material, difficulty with deployment and storage of the cover, and stability and ease of fastening the cover to the vehicle. For instance, in U.S. Pat. No. 5,456,515 to Dang, a vehicle protective cover is disclosed in which a shade cover assembly is mounted in the trunk and may be unwound to shade the windowed areas of the vehicle and prevent heating of the vehicle compartment by ultra-violet radiation. The arrangement of Dang fails to cover the major surfaces of the vehicle, including the hood, roof, trunk, and sides; merely providing shade for the glassed surfaces of the vehicle, and no protection for the majority of the vehicle's surface area.

Another covering device is disclosed in U.S. Pat. No. 5,941,593 to McCann. The McCann patent is limited in that it only provides coverage to the top surfaces of the vehicles, leaving the sides and ends open to the weather elements. It is further limited in that it contains "stabilization spars" which must be tightened and bent in order for the cover to drape appropriately over the vehicle's surfaces.

Accordingly, the need exists for a small vehicle cover which will provide adequate coverage from weather conditions to the top and side surfaces of the vehicle and which is easily adaptable to the varying sizes and shapes of vehicles. Furthermore, the need exists for a vehicle cover that is retractable into a housing, that attaches easily and does not require vehicle modification. Thus, heretofore unaddressed needs exist in the art to satisfy the aforementioned deficiencies and inadequacies.

SUMMARY OF THE INVENTION

The present invention provides a system for covering small vehicles, such as ride-on lawn mowers, all-terrain vehicles (ATVs), or other similar vehicles with a retractable covering apparatus which solves the aforementioned problems of the prior art. More specifically, the present invention is easily adaptable to vehicles of different proportions, mounts easily to the vehicle, and provides protection from the weather elements for substantially all of the top and side surfaces of the vehicle.

Briefly described, in architecture, the system can be implemented in a preferred embodiment as follows. The retractable cover apparatus generally comprises an elongated housing attached to a vehicle. The housing preferably having an outer shell with an opening therein. Each end of the outer shell is bounded by end caps. Within the housing outer shell is preferably disposed a winding mechanism. This winding mechanism may take the form of a spring-loaded rod, such as that commonly contained in pull down window shades. The retractable cover apparatus also comprises a cover engaging the winding mechanism such that the cover is moveable between an extended position covering a front, a rear, and side portions of the vehicle and a retracted position where the cover is contained within the housing. The apparatus also comprising retention members having a first and a second end. These retention members are removably affixed to an orifice in the cover at said first end and an exterior surface of the vehicle at a second end so as to secure the cover to the vehicle.

The present invention can also be viewed as providing a method for covering at least a substantial portion of the exterior of a vehicle with a weather resistant cover. In this regard, the method can be broadly summarized by the steps that follow. Providing a housing attached to a vehicle. The housing preferably contains a spring-loaded rod with a cover material rolled about this spring-loaded rod. Pulling the cover material from the housing. Where the action of pulling the cover results in unrolling the cover material from about the spring-loaded rod. Covering a top portion of the vehicle with the cover. Unfolding opposing side flaps of the cover in order to cover side portions of the vehicle. Attaching a first end of a retention member to the cover. Attaching a second end of the retention member to the vehicle. The step of attaching the second end of the retention member securing the cover about and to the vehicle.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a side view of a housing for use in the preferred embodiment of a retractable cover apparatus depicted in FIG. 1.

FIG. 3 is a perspective view of the preferred embodiment of a retractable cover apparatus depicted in FIG. 1, focussing on the aspects of the housing and its attachment to the vehicle.

FIG. 6 is a top view of a cover for use in the retractable cover apparatus depicted in FIG. 1.

DETAILED DESCRIPTION OF THE PREFERRED EMBODIMENT

It will be obvious to those skilled in the art that many modifications and variations may be made to the preferred embodiments of the present invention, as described hereafter, without substantially departing from the spirit and scope of the present invention. All such modifications and variations are intended to be included herein within the scope of the present invention, as set forth in the appended claims.

Figure 1:
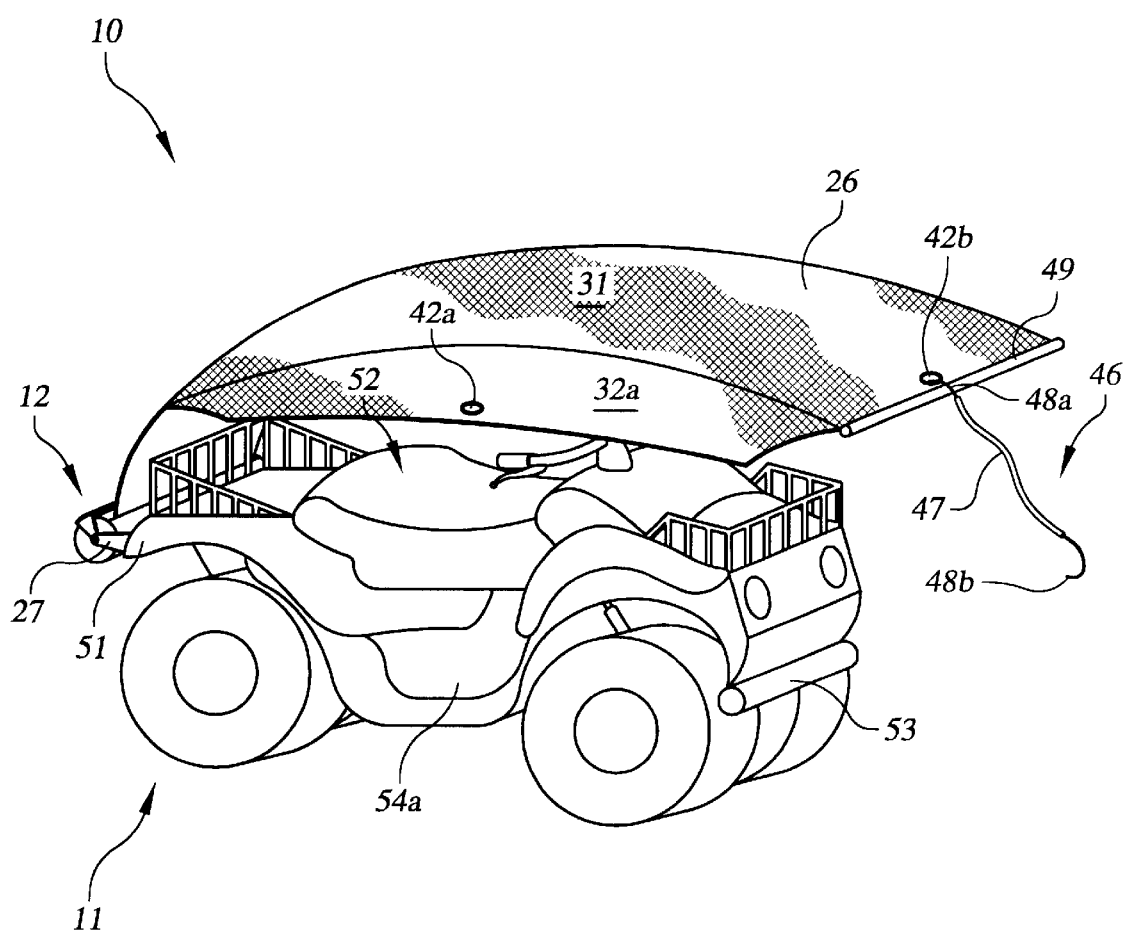
FIG. 1 is a perspective view of the preferred embodiment of a retractable cover apparatus in the process of being deployed on a small vehicle.

A preferred embodiment for a retractable cover apparatus 10 is generally depicted in FIG. 1. In the preferred embodiment, the retractable cover apparatus 10 is deployed on an all-terrain vehicle 11 (hereinafter "ATV"). However, the apparatus 10 is equally suited for use with other, similar small vehicles, such as a ride-on lawnmower, go-cart, or a lawn tractor and is, in fact, intended for such use.

As depicted in FIG. 1, the preferred embodiment of the retractable cover apparatus 10, in a broad sense, preferably includes a generally tubular housing 12 attached to an exterior surface of the vehicle 11. As depicted in FIG. 1, the housing 12 of the preferred embodiment is attached to a rear portion 51 of the vehicle 11. The housing 12 is preferably attached to the vehicle 11 by brackets 27. The housing 12 is equipped with a spring-loaded rod 41 (not shown in FIG. 1) about which a cover 26 is wound. A handle portion 49 of the cover 26 protrudes from the housing 12 through a slot 24 in the housing 12. In this manner the cover 26 of the preferred embodiment is stored within the housing 12, until it is desired to use the cover 26. As depicted in FIG. 1, the cover 26 is pulled from the housing 12 and over the top exterior surface 52 of the vehicle 11. As also depicted in FIG. 1, the preferred embodiment 10 includes retention members 46 for securing the cover 26 to the exterior of the vehicle 11. Thus, in use, the cover 26 may be extended or retracted through the slot 24 in the housing 12 and secured to the vehicle 11 with retention members 46. A more detailed explanation of the retractable cover apparatus 10 will be set forth below.

The preferred embodiment 10 preferably comprises a generally tubular housing 12. As depicted in FIG. 2, the housing 12 comprises a substantially tubular shell 13, making up the primary portion of the housing 12, and end caps 14a, 14b on each end of the tubular shell 13. The end caps 14a, 14b are sized to cover the entire end portion of the shell 13. In fact, as depicted in FIG. 2, the end caps 14a, 14b overlap the exterior of the shell 13 so as to provide a frictional grip with the exterior surface of the shell 13.

The housing 12 and end caps 14a, 14b may be comprised of a variety of suitable materials. Although one skilled in the art would easily recognize what materials may be suitable for this use, it is preferred that a non-corrosive, light-weight material be used for the housing 12. In the preferred embodiment 10, PVC (poly-vinyl-chloride) plastic pipe is used to form the outer shell 13 of the housing 12. The end caps 14a, 14b are preferably PVC piping end caps. These end caps 14a, 14b can be glued onto the shell 13 by commonly availably PVC adhesive. However, it may be desirable to refrain from gluing the end caps 14a, 14b onto the shell 13 in order to permit access to an interior portion of the housing 12 for maintenance or cleaning. Thus, the frictional fit between the end caps 14a, 14b and the shell 13 may be sufficient.

The diameter of the tubular shell 13 and the length of the shell 13 will vary depending on the size of the vehicle 11 and the type of cover material used. Generally, the length of the housing 12 should be approximately the width of the vehicle 11. The diameter of the housing shell 13 is preferably big enough to house all of the cover 26, when the cover 26 is wound about the spring-loaded rod 41. One with skill in the art can easily determine the appropriate size of the housing depending on the particular use.

As shown in FIG. 2, the housing 12 preferably has perforations 16 in the shell 13. These perforations 16 are relatively small in size and disposed generally at a bottom portion of the shell 13. The purpose of the perforations 16 is to permit any accumulated moisture that is in the interior of the housing 12 to drain out of the housing 12. The tubular shell 13 of the housing 12 preferably contains a slot 24 extending an entire length of the housing 12, as depicted in FIG. 2. The slot 24 is of sufficient length and width so as to permit the cover 26 to pass therethrough when the cover 26 is extended from the housing 12. The length of the slot 24 will vary depending on the width of the cover 26 used in the preferred embodiment 10. The width of the slot 24 will vary depending on the thickness of the cover 26 used in the preferred embodiment 10. One with skill in the art will be able to determine the appropriate length and width of a slot 24 for a particular application. As depicted in FIG. 2, it is easiest to simply allow the slot 24 to extend the entire width of the tubular shell 13 of the housing 12.

As further depicted in FIG. 2, a stud 17a, 17b is centrally located along an exterior side of each of the end caps 14a, 14b. These studs 17a, 17b may be molded into the PVC end caps 14a, 14b. However, in the preferred embodiment 10, the studs 17a, 17b are threaded such as to screw into the end caps 14a, 14b. Alternatively, the studs could be plastic or metal dowels glued onto the exterior of the end caps 14a, 14b.

Figure 4:
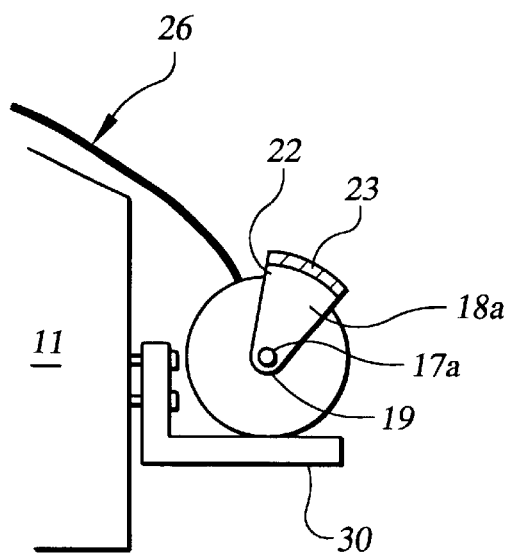
FIG. 4 is a side view of the preferred embodiment of a retractable cover apparatus depicted in FIG. 1, focussing on the aspects of the housing and its attachment to the vehicle and exhibiting an alternative attachment mechanism.

The primary purpose of the studs 17a, 17b of the preferred embodiment is to attach a shield member 23 to the housing 12, as depicted best in FIGS. 3 and 4. In order to attach the shield 23 to the housing 12 via the studs 17a, 17b, brackets 18a, 18b are preferably employed. The brackets 18a, 18b as depicted best in FIG. 4, preferably comprise a rounded exterior portion 19 having a centrally-located hole 21 therein. The brackets 18a, 18b also comprise an attachment side 22. The attachment side 22 can be generally described as a lip, forming an ell shape with the primary body of the bracket 18a, 18b. This attachment side 22 of the bracket 18a, 18b is affixed to a shield 23. The brackets 18a, 18b are preferably attached to the shield 23 via screws or rivets. Of course, other attachment means as may be recognized as appropriate by one with skill in the art may be used to attach the brackets 18 to the shield 23.

In this manner of attachment, the shield 23 is rotatable about the housing 12 because the brackets 18a, 18b are rotatable about the studs 17a, 17b. As depicted best in FIG. 3, the shield 23 is a semi-circular body that stretches a length of the housing 12 and is positionable over the slot 24. In this manner, the shield 23 may be positioned over the slot 24 and prevent materials or weather from falling through the slot and into the tubular shell 23.

As noted above, the housing 12 is secured to an exterior portion of the vehicle 11, preferably the rear exterior portion 51. As depicted in FIGS. 1 and 3, the housing 12 is preferably secured directly to the rear portion 51 of the vehicle by mounting brackets 27. The mounting brackets 27 are designed to resemble the brackets 18a, 18b used to attach the shield 23 to the studs 17a, 17b. In fact, as depicted in FIG. 3, the mounting brackets 27 generally have a rounded exterior portion 28 with a centrally-located hole therein. The mounting brackets 27 also comprise an attachment side 29. The attachment side 29 of the mounting bracket 27 is affixed to the rear portion 51 of the vehicle 11. The mounting brackets 27 are preferably attached to the vehicle 11 via screws or rivets. Of course, other attachment means as may be recognized as appropriate by one with skill in the art may be used to attach the mounting brackets 27 to the vehicle 11.

Unlike the brackets 18a, 18b for the shield 23, it is not desirable that the mounting brackets 27 permit the rotation of the studs 17a, 17b within the mounting bracket exterior portion 28. Thus, the exterior portion 28 is crimped to the studs 17a, 17b.

Alternatively, the housing 12 may attach to a pair of L-brackets 30, as depicted in FIG. 4. The L-brackets 30 are then affixed to the vehicle with an appropriate affixing device, such as screws. When using the L-brackets 30, it is not necessary for the mounting brackets 27 to be used. In this way, the L-brackets 29 could be screwed or glued to the housing 12.

Figure 5:
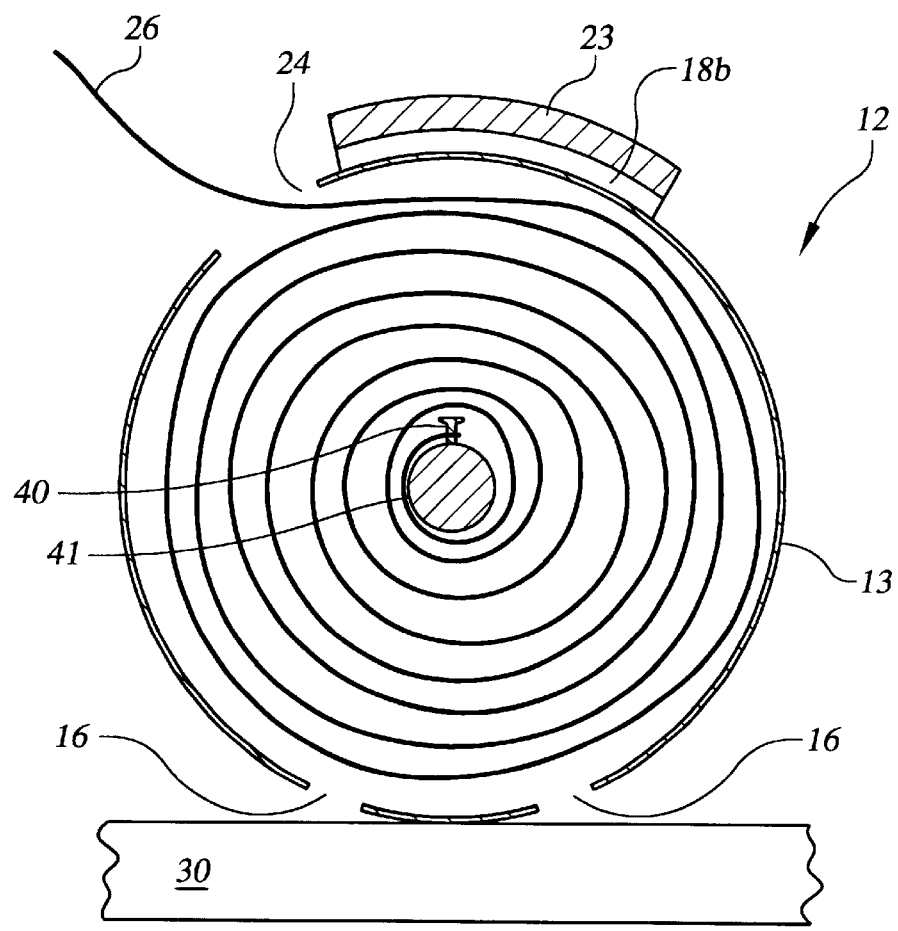
FIG. 5 is a cut away side view of the embodiment of a retractable cover apparatus depicted in FIG. 4.

As best shown in FIG. 4 and cutaway view FIG. 5, the housing 12 is preferably attached to the rear portion 51 of the vehicle 11 such that the slot 24 is pointing generally upward. The slot 24, as described above, generally denotes the exit point for the cover 26 from the housing 12. For this reason, it is desirable for the slot 24 to be upward so that the usage of the cover 26 is optimized. In the preferred embodiment, the slot 24 is offset at an angle of approximately 30 degrees from vertical, towards the vehicle 11. This permits the cover to exit the housing 12, through the slot 24 and quickly come into contact with the vehicle surface. It is believed that this angle comes closest to maximizing the use of the cover 26.

As noted above, the preferred embodiment 10 depicted in FIG. 1 comprises a cover 26. The preferred design of a cover 26 for the retractable cover apparatus 10 is depicted in FIG. 6. As detailed in FIG. 6, the cover 26 generally comprises of three sections: an elongated panel 31 and two flaps 32a, 32b. The panel 31 is preferably rectangular in shape having a length and a width. The width of the panel 31 is bounded by longitudinal edges 33a, 33b on the other hand, the length of the panel 31 is bounded by a front edge 34 and a rear edge 35. The front edge 34 of the panel 31 preferably forms a bulbous stopping handle 49. The handle 49 is preferably formed by stitching the end of the panel 31 around a dowel. In this way, the dowel is contained within the edge of the fabric. The dowel should preferably be sized to have a diameter larger than the slot 24 in the tubular shell 13. In this way, when the cover 26 is retracted into the housing 12, the handle 49 will stop at the slot 24 and permit the user to grasp this handle 49 in order to pull the cover 26 from the housing 12.

As depicted in FIG. 6, the flaps 32a, 32b preferably comprise a trapezoidal shape having a base edge 36, a top end 37 and angled side edges 38a, 38b. The flaps 32a, 32b are attached to the panel 31 along the longitudinal edges 33a, 33b of the panel 31 via the base edge 36 of the flaps 32a, 32b. The flaps 32a, 32b are preferably attached to the panel 31 via stitching the three pieces together. However, as will be understood with one of skill in the art, the method of attachment may be varied depending on the material used.

Because of the method of attachment of the preferred embodiment 10, seams 39a, 39b are formed. These seams 39a, 39b will aid in the folding of the flaps 32a, 32b onto a top surface of the panel 31 for extension and retraction of the cover 26. In another aspect of the retractable cover apparatus 10, the flaps 32a, 32b may be pleated in order to aid in the drape of the cover 26 over the various surfaces of the vehicle 11. In another alternative embodiment, the panel 31 and flaps 32a, 32b may be manufactured as one piece.

The cover 26 is preferably constructed of a fabric material, such as is common for tents and tarps. Such material preferably comprises polyurethane coated nylon taffeta. On the other hand, other coated nylon or polyester material, such as silicone elastomer coated nylon, would be equally effective. These materials are generally considered lightweight and resistant to moisture, such as rain, snow, and ice. If it is also desired that the cover 26 be resistant to ultraviolet light, then additional coatings may be added to the nylon taffeta material. On the other hand, if weight is not a concern, then a coated cotton material, such as an Army Duck Canvass with a Sunforger® finish may be used. However, due to potential weight constraints, this material is not generally preferred.

As best depicted in FIG. 5, the rear edge 35 of the cover 26 is preferably affixed to a winding mechanism contained inside of the housing. The preferred embodiment of the winding mechanism is a spring-loaded rod 41. This rod 41 is positioned to span from the interior portion of one end cap 14a to the other end cap 14b of the housing 12. The rod is also positioned within the housing 12 such as to be coaxial with the tubular shell 23. The rod 41 is preferably affixed to the interior walls of the end caps 14a, 14b by brackets, similar to those commonly used with pull-down window shades. Alternatively, the ends of the rod could be designed to protrude through a centrally located hole in the end caps 14a, 14b such that the ends of the spring-loaded rod 41 for the studs 17a, 17b.

The spring-loaded rod 41 is preferably designed like a common window shade. U.S. Pat. No. 3,763,916, issued to Gossling on Oct. 9, 1973, entitled Window Shade Motor describes a basic design for the spring-loaded rod 41 of the preferred embodiment. The design includes a spring motor for tensioning the cover 26 and retracting the cover 26 when not held in an extended position. One with skill in the art will easily be able to adapt the teaching in the window shade art to apply to the preferred embodiment of the herein described vehicle covering apparatus 10. U.S. Pat. No. 3,763,916, issued to Gossling on Oct. 9, 1973, entitled Window Shade Motor, is hereby incorporated herein by reference.

U.S. Pat. No. 4,427,050, issued to Toppen on Jan. 24, 1984, entitled Window Shade Clutch Assembly, describes an alternative embodiment of the spring-loaded rod 41 of the present invention. This alternative aspect adds a clutch assembly for permitting the cover 26 to be held in an extended position. U.S. Pat. No. 4,427,050, issued to Toppen on Jan. 24, 1984, entitled Window Shade Clutch Assembly, is hereby incorporated by reference herein.

The cover 26 is preferably affixed to the spring-loaded metal rod 41 by a metal rivet 40 driven through the rear edge 35 of the cover 26 and into the rod 41, as shown in FIG. 5. Alternatively, the cover 26 may be affixed to the rod 41 by other means, such as glue, or by clamping the rear edge 35 of the cover 26 into a groove cut into the surface of the rod 41.

Although the length and width of the cover 26 may vary depending on the application, and the particular vehicle 11 used, the preferred length of the cover 26 is approximately nine feet and the preferred width of the cover 26 is approximately seven feet. Of course, the larger the vehicle 11 sought to be covered, the larger the cover 26 should be.

As depicted in FIG. 1 and FIG. 6, at least at three locations along a periphery of the cover 26 there are preferably orifices 42a–42c. It is preferred that one orifice 42a be positioned along a side edge 38a of one of the flaps 32a. Then, a second orifice 42b is preferably positioned along the front edge 34 of the panel 31, inward of the handle 49. Finally, an orifice 42c is positioned along a side 38b of the second flap 32b. While these orifices 42 may simply comprise holes in the cover material, it is preferred that a grommet 43 encircle the orifice 42. In certain applications where the length of the cover 26 is enlarged, it may be preferable to use at least two orifices on each side of the cover 26. Additionally, depending on the width of the vehicle 11, more than one orifice may be used along the front edge 34 of the cover 26.

The grommets 43 of the preferred embodiment serve to prevent the ripping or tearing of the cover material. To this end, the grommets 43 are constructed of metal or rubber. The preferred material is aluminum. Additionally, to prevent the tearing of the cover material, the orifices 42 are preferably positioned some distance from the edge of the cover 26. Obviously, the more material that is between the orifice 42 and the actual material edge, the greater resistance to tearing when stress or tension is placed on the grommets 43. In the preferred embodiment, the inside edges of the orifices 42 are about one inch from the edge of the cover material.

When deployed, the cover 26 is secured to the vehicle 11 via retention members 46. In the preferred embodiment depicted in FIG. 1, these retention members 46 comprise a stretchable cord member 27 and a pair of hooks 48a, 48b on each end of the stretchable cord member 47. In this manner, a first hook 48a may be passed through the grommet and the second hook 48b may be affixed to an exterior portion of the vehicle 11 when the cover 26 is deployed over the vehicle Before the cover 26 is rolled into the housing 12, the retention members 46 are preferably removed from the cover 26. Although the housing 12 and corresponding parts may be sized to accommodate the retention members 46 being rolled into the cover 26, this may damage the cover material and is not preferred.

The method of using the preferred embodiment 10 will now be described in detail. In use, the cover 26 begins wound around the spring-loaded rod 41 inside of the housing 12. In this standard storage position, the shield 23 is preferably positioned over the slot 24. In this way, the shield 23 can prevent moisture or other items from falling through the slot 24 and into the interior of the housing 12.

In order to use the cover 26, the shield 23 is rotated away from the slot 24. The user grasps the handle 49 of the cover 26 and pulls the cover up from the housing 12. The springloaded feature of the rod 41 will provide a tension against this pulling motion. The cover 26 is carefully pulled through the slot 24 and away from the housing 12, up over the rear portion 51 of the vehicle 11 and then over a top portion 52 of the vehicle and then along a front portion 53 of the vehicle 11.

When the cover 26 is fully extended, it is preferred that the orifice 42b along the front edge 34 of the cover 26 has one of the hooks 48a of a retention member 46 passed therethrough. Then, the opposing hook 48b of the retention member 46 may be affixed to a front portion 53 of the vehicle 11. This will secure the cover 26 in place while the other sides of the cover 26 are affixed to the vehicle 11. Then, once the cover is secured and kept from rolling back into the housing 12, the flaps 32a, 32b of the cover 26 are unfolded such as to overlay the side portions 54a, 54b of the vehicle 11. Upon unfolding the flaps 32a, 32b, additional retention members 46 may be used to secure the flaps 32a, 32b to the side portions 54a, 54b of the vehicle 11. In this manner, the cover 26 of the preferred embodiment 10 completely encapsulates the exterior surfaces of the vehicle 11, except for the bottom surface. In other words, both front and back portions are covered, as well as both side portions.

When it is desired to put the cover 26 away, the side retention members 46 are detached from the vehicle 11 and then from the flaps 32a, 32b. The flaps 32a, 32b are folded onto an upper surface of the panel 31 of the cover 26. While the user is grasping the handle 49, the front retention member 46 is detached from the vehicle and from the cover 26. Then, a user permits the spring-loaded rod 41 to pull the cover 26 back into the housing 12 as the user, grasping the handle 49, walks along side the vehicle 11. Once the handle 49 comes to rest against the shell 13 of the housing 12, the user releases the handle 49. Once the cover 26 is secured within the housing 12, the shield 23 is moved to cover the slot 24 in the housing 12.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

We claim:

1. A vehicle covering system comprising:

a four wheel outdoor recreational vehicle, said four wheel outdoor recreational, vehicle having an exterior comprising side portions, a front portion, and a rear portion;

an elongated housing attached to said four wheel outdoor recreational vehicle, wherein said housing comprises a tubular body portion having an outer shell and an opening in said outer shell comprising a slot along a length of said tubular body, wherein said housing further comprises end caps attached to each end of said tubular body, wherein each said end cap has a centrally located stud;

a shield member attached to said studs, said shield member attached such that said shield member rotates about the studs so as to selectively cover and uncover the slot, wherein said shield member moves about the studs along a circular path;

a winding mechanism disposed within said housing;

a cover engaging said winding mechanism such that said cover is moveable between an extended position covering the front, rear, and side portions of said four wheel outdoor recreational vehicle and a retracted position where said cover is rolled about a rod in an interior of said housing; and retention members having a first and a second end, said retention members removably affixed to an orifice in said cover at said first end and the exterior of the four wheel outdoor recreational vehicle at a second end so as to secure said cover to said four wheel outdoor recreational vehicle.

2. The system of claim 1, wherein said cover comprises:

an elongated panel for covering a top portion of said vehicle; and side flaps extending from said elongated panel for covering the side portions of said vehicle.

3. The system of claim 2, wherein said cover is formed of a weather resistant material.

4. The system of claim 3, wherein said weather resistant material comprises a polyurethane coated nylon taffeta.

5. The system of claim 1, wherein said cover comprises at least three orifices therein.

6. The system of claim 5, wherein said orifices are at least partially defined by grommets.

* * * * *